US012537609B2

(12) United States Patent
Orozco et al.

(10) Patent No.: US 12,537,609 B2
(45) Date of Patent: Jan. 27, 2026

(54) MODULATED OVER-THE-AIR MEASUREMENTS ON DUAL POLARIZATION SIGNALS

(71) Applicant: NATIONAL INSTRUMENTS CORPORATION, Austin, TX (US)

(72) Inventors: Gerardo Orozco, Scottsdale, AZ (US); Thomas Deckert, Dresden (DE); Nan Yang, Shanghai (CN)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 407 days.

(21) Appl. No.: 18/151,426

(22) Filed: Jan. 7, 2023

(65) Prior Publication Data
US 2024/0235699 A1    Jul. 11, 2024

(51) Int. Cl.
*H04B 17/00*    (2015.01)
*G01R 29/08*    (2006.01)

(52) U.S. Cl.
CPC ..... *H04B 17/0085* (2013.01); *G01R 29/0892* (2013.01)

(58) Field of Classification Search
CPC ............ G01R 31/2841; G01R 31/2856; G01R 29/0892; H04B 17/0085
USPC ......... 324/95, 600, 617–622, 650, 500, 521, 324/683, 76.11, 76.52, 76.53, 76.77, 324/757.05, 762.03
See application file for complete search history.

(56) References Cited

U.S. PATENT DOCUMENTS

| | | | |
|---|---|---|---|
| 7,936,314 B2 | 5/2011 | Kuramoto et al. | |
| 10,623,075 B2 | 4/2020 | Pratt et al. | |
| 10,969,427 B2 * | 4/2021 | Rowell | G01R 31/3025 |
| 11,342,961 B1 * | 5/2022 | Vis | H04B 17/29 |
| 12,193,107 B2 * | 1/2025 | Mlinarsky | H04W 24/08 |
| 2012/0100813 A1 | 4/2012 | Mow et al. | |
| 2021/0293869 A1 * | 9/2021 | Kobayashi | G01R 29/0878 |
| 2021/0341528 A1 * | 11/2021 | Sanchez Hernandez | H01Q 1/38 |
| 2022/0308107 A1 * | 9/2022 | Hesselbarth | G01R 31/3025 |

FOREIGN PATENT DOCUMENTS

EP    3375217 B1    7/2022

* cited by examiner

*Primary Examiner* — Huy Q Phan
*Assistant Examiner* — Trung Q Nguyen
(74) *Attorney, Agent, or Firm* — Kowert, Hood, Munyon, Rankin & Goetzel, P.C.; Jeffrey C. Hood

(57) ABSTRACT

A system and method for determining an error vector magnitude (EVM) of a polarized transmission from a device-under-test (DUT). A first signal transmitted by the DUT is received via a horizontally polarized receiver antenna, and a second signal transmitted by the DUT is received via a vertically polarized receiver antenna. The second signal is coherent with the first signal. The EVM is calculated based at least in part on the first signal and the second signal and a reference signal.

20 Claims, 14 Drawing Sheets

View from measurement antenna

View from DUT x axis: Angular displacement between DUT and measurement antenna polarization planes y axis: Detected angle $\theta_1$ (deg)

Received power by horizontally polarized measurement antenna

Received power by vertically polarized measurement antenna

Coherently combined power

EVM of coherently combined signal

MODULATED OVER-THE-AIR MEASUREMENTS ON DUAL POLARIZATION SIGNALS

FIELD OF THE INVENTION

The present invention relates to the field of semiconductor testing, and more specifically, to testing of integrated circuits with integrated antennas configured to transmit and/or receive polarized wireless signals.

DESCRIPTION OF THE RELATED ART

Wireless devices that communicate using the $5^{th}$ Generation (5G) wireless standard are calibrated during construction of the device by measuring modulated signals over-the-air (OTA) using mmWave technologies. This is a very common practice and once the device under test (DUT) is placed in a measurement chamber, there are multiple methods to get the signal using some sort of measurement antenna connected to the test equipment.

It is important during testing to align the measurement antenna polarization with the DUT polarization prior to performing the measurements. To achieve polarization alignment, either the DUT or the measurement antenna is typically rotated in their fixtures. A common choice is to rotate the measurement antenna as this capability may be designed into the OTA measurement system and eases the handling of bulky DUTs and the routing of cables to the DUT.

Performing manual rotations prior to modulated signal measurements increases the construction cost of the measurement system and the elapsed time for performing measurements. Accordingly, improvements in the field of performing modulated wireless signal measurements are desired.

SUMMARY OF THE INVENTION

Various embodiments are presented below of a system and method for determining an error vector magnitude (EVM) of polarized transmissions from a device-under-test (DUT).

In some embodiments, a first signal transmitted by the DUT is received via a horizontally polarized receiver antenna, and a second signal transmitted by the DUT is received via a vertically polarized receiver antenna. In some embodiments, the DUT is a dual-polarized antenna configured to transmit a wireless signal with an adjustable polarization, and one or more polarized wireless signals may be received by the horizontally and vertically polarized receiver antennas as the first and second signals, respectively. The second signal may be coherent with the first signal.

In some embodiments, the polarized transmission from the DUT is polarized at an angle (potentially unknown) that is unaligned with the polarization axes of the horizontally polarized receiver antenna and/or the vertically polarized receiver antenna.

In some embodiments, the horizontally polarized receiver antenna and the vertically polarized receiver antenna are coupled to separate first and second vector signal analyzers (VSAs), respectively. The first and second VSAs may share a single local oscillator, which may enable the horizontally and vertically polarized receiver antennas to receive signals that are coherent with each other in phase.

In other embodiments, the horizontally polarized receiver antenna and the vertically polarized receiver antenna are coupled through a switch to a vector signal analyzer (VSA), and the first and second signals are received from two respective sequential transmissions by the DUT in a time-duplexed manner.

In some embodiments, an error vector magnitude (EVM) of a polarized transmission from the DUT is determined based at least in part on the first signal and the second signal. In some embodiments, the EVM is determined by coherently combining the first and second signals to reproduce the polarized transmission from the DUT, and taking a difference between the reproduced polarized transmission and a reference signal.

Note that the techniques described herein may be implemented in and/or used with a number of different types of systems-under-test (SUTs) and/or DUTs, including but not limited to cellular phones, vehicles, portable media players, tablet computers, wearable devices, RF semiconductor components, RF power amplifiers, Front End Modules, transceivers, and various other computing devices.

This Summary is intended to provide a brief overview of some of the subject matter described in this document. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the preferred embodiment is considered in conjunction with the following drawings, in which.

Figure 1A:
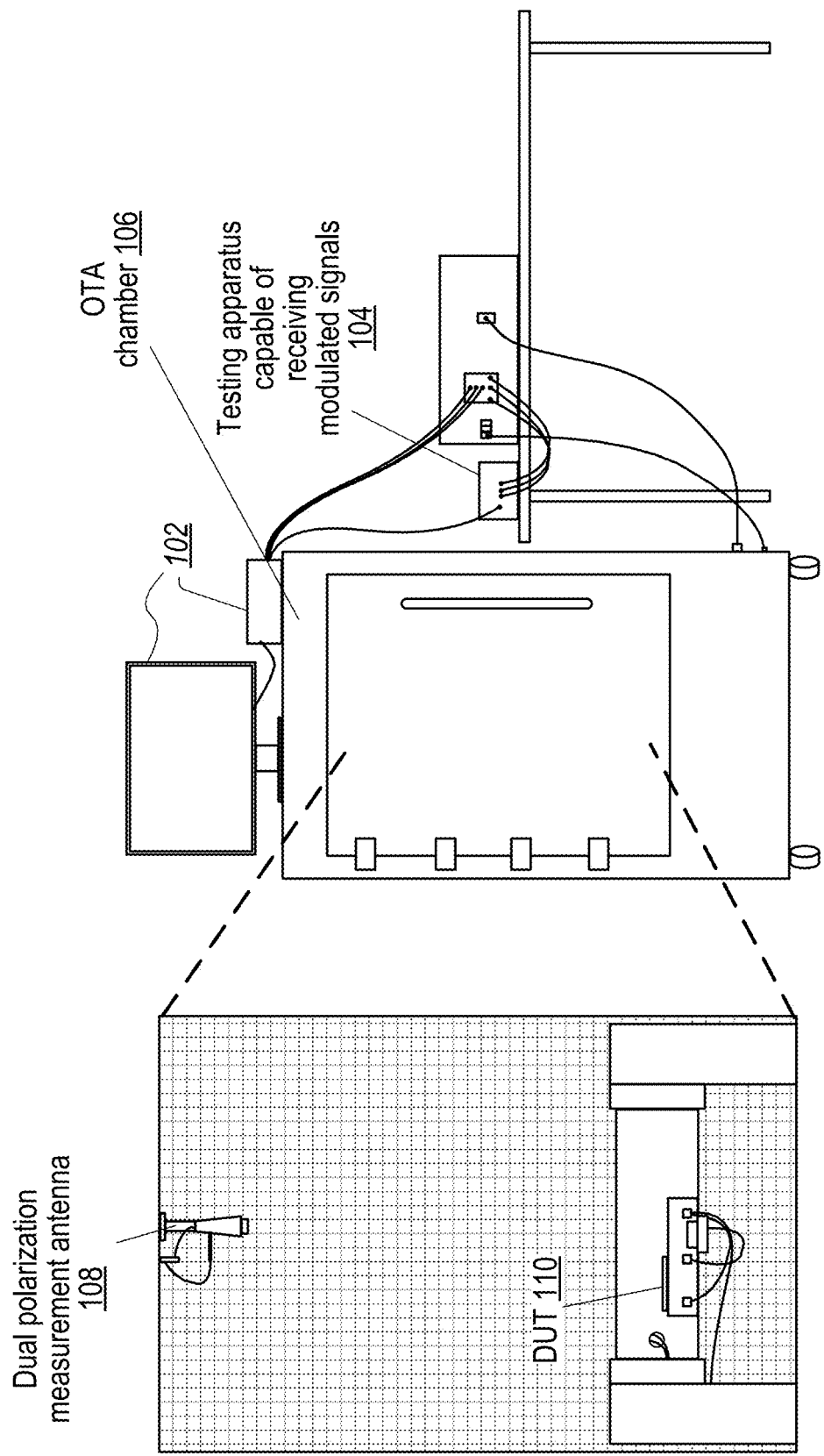
FIG. 1A illustrates an over the air (OTA) testing configuration including a device-under-test (DUT) and a dual-polarized receiver antenna positioned within an anechoic chamber, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Acronyms

The following is a listing of the acronyms used in the present application:
DUT: Device Under Test
EVM: Error Vector Magnitude
QAM: Quadrature Amplitude Modulation
EIRP: Effective Isotropic Radiated Power
FF: Far-Field
IF: Intermediate Frequency
NF: Near-Field
OTA: Over-the-Air
RF: Radio Frequency
TRP: Total Radiated Power
VNA: Vector Network Analyzer
CATR: Compact Antenna Test Range
PAS: Probe Antenna System

Terms

The following is a glossary of terms used in the present application:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Program—the term "program" is intended to have the full breadth of its ordinary meaning. The term "program" includes 1) a software program which may be stored in a memory and is executable by a processor or 2) a hardware configuration program useable for configuring a programmable hardware element.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are configured to acquire and/or store data. A measurement device may also optionally be further configured to analyze or process the acquired or stored data. A measurement device may also optionally be further configured as a signal generator to generate signals for provision to a device-under-test. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, a signal generator, and other similar types of devices. Exemplary "stand-alone" instruments include oscilloscopes, multimeters, signal analyzers, arbitrary waveform generators, spectroscopes, and similar measurement, test, or automation instruments.

A measurement device may be further configured to perform control functions, e.g., in response to analysis of the acquired or stored data. For example, the measurement device may send a control signal to an external system, such as a motion control system or to a sensor, in response to particular data. A measurement device may also be configured to perform automation functions, i.e., may receive and analyze data, and issue automation control signals in response.

Functional Unit (or Processing Element)—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

Wireless—refers to a communications, monitoring, or control system in which electromagnetic or acoustic waves carry a signal through space rather than along a wire.

Approximately—refers to a value being within some specified tolerance or acceptable margin of error or uncertainty of a target value, where the specific tolerance or margin is generally dependent on the application. Thus, for example, in various applications or embodiments, the term approximately may mean: within 0.1% of the target value, within 0.2% of the target value, within 0.5% of the target value, within 1%, 2%, 5%, or 10% of the target value, and so forth, as required by the particular application of the present techniques.

Far-Field (FF) pattern—a pattern of electromagnetic radiation that exists (or is presumed to exist) in a far field region around an object generating the electromagnetic radiation. An antenna, or a plurality of antenna elements, driven by a signal create electromagnetic fields. In general, the observed amplitude and phase of the electromagnetic fields varies with distance of the observer from the radiating object and with angular direction from the object to the observer. The FF pattern refers to the far field pattern of electromagnetic fields around the antenna (or the object containing the antenna), and references the fact that amplitude and phase of these fields observed at some distance from the radiating object and taken relative to a reference point at the same distance will be independent of distance from the object. The FF pattern or gain is a well-known electromagnetic concept.

Figure 1B:
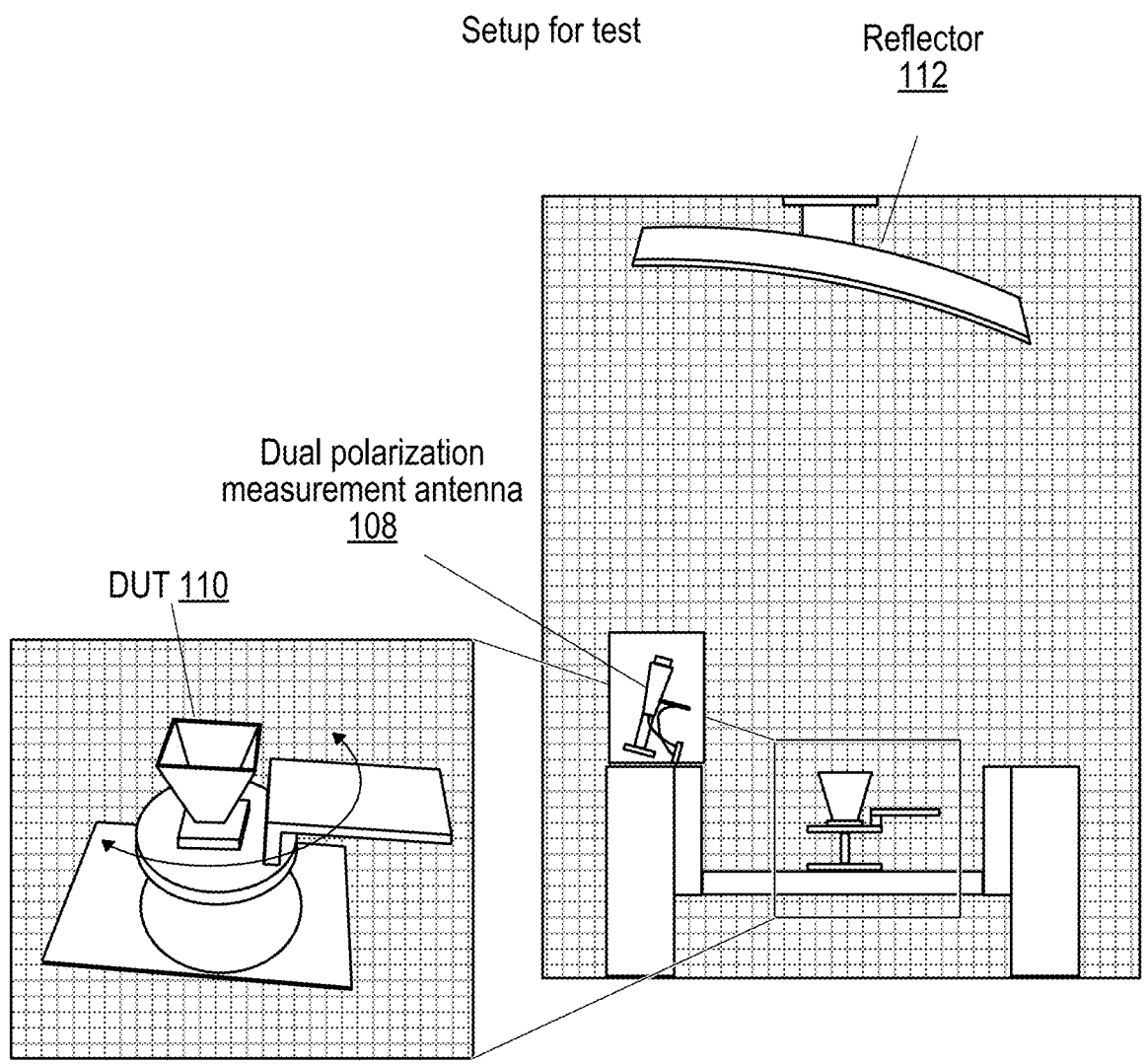
FIG. 1B illustrates another OTA testing configuration, according to some embodiments.

FIGS. 1A-B—OTA Testing System

FIG. 1A illustrates an over the air (OTA) testing system configured to implement embodiments of the techniques disclosed herein, according to some embodiments. Embodiments of a method for OTA testing (e.g., for production testing of integrated circuits) are described below.

Note that various embodiments of the techniques disclosed herein may be implemented in a variety of different ways. For example, the methods described herein may be performed by software executing on a computer system. However, while some embodiments are described in terms of one or more programs executing on a computer, these embodiments are exemplary only, and are not intended to limit the techniques to any particular implementation or platform. Thus, for example, in some embodiments, the techniques may be implemented on or by a functional unit (also referred to herein as a processing element), which may include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

As shown in FIG. 1A, the OTA test system may include a computer system 102 which couples to a testing apparatus 104. In FIG. 1A the computer system is shown as being a stand-alone computer system separate from the testing apparatus, but it may also be implemented within or as part of the testing apparatus. For example, the computer may be implemented as a board or module inserted into a PXI (PCI eXtensions for Instrumentation) chassis form factor. Any of various types of computer system and/or chassis configuration may be used.

FIG. 1A further illustrates an OTA chamber 106, which may be an anechoic chamber as is configured to contain the DUT 110 and a dual-polarization measurement antenna 108. The dual polarization measurement antenna may be configured to receive polarized transmissions from the DUT and provide these transmissions to the testing apparatus 104 and/or the computing system 102. Note that throughout this disclosure, "receiver antenna" and "measurement antenna" are used interchangeably to refer to an antenna configured to receive transmissions from a DUT.

FIG. 1B is another example illustration of a DUT 110 and a dual-polarized receiver antenna configured within an anechoic chamber, according to some embodiments. FIG. 1B illustrates an indirect far-field chamber, also known as a compact antenna test range (CATR). In FIG. 1B, the DUT transmits signals to a reflector 112 at the top of the chamber, which reflects the signals back to the dual-polarized measurement antenna 108.

FIG. 1A and the detail in FIG. 1B illustrate how the DUT 110 may be placed on a rotatable platform that can rotate the DUT to different orientations to measure a beamforming pattern, according to some embodiments.

Figure 2:
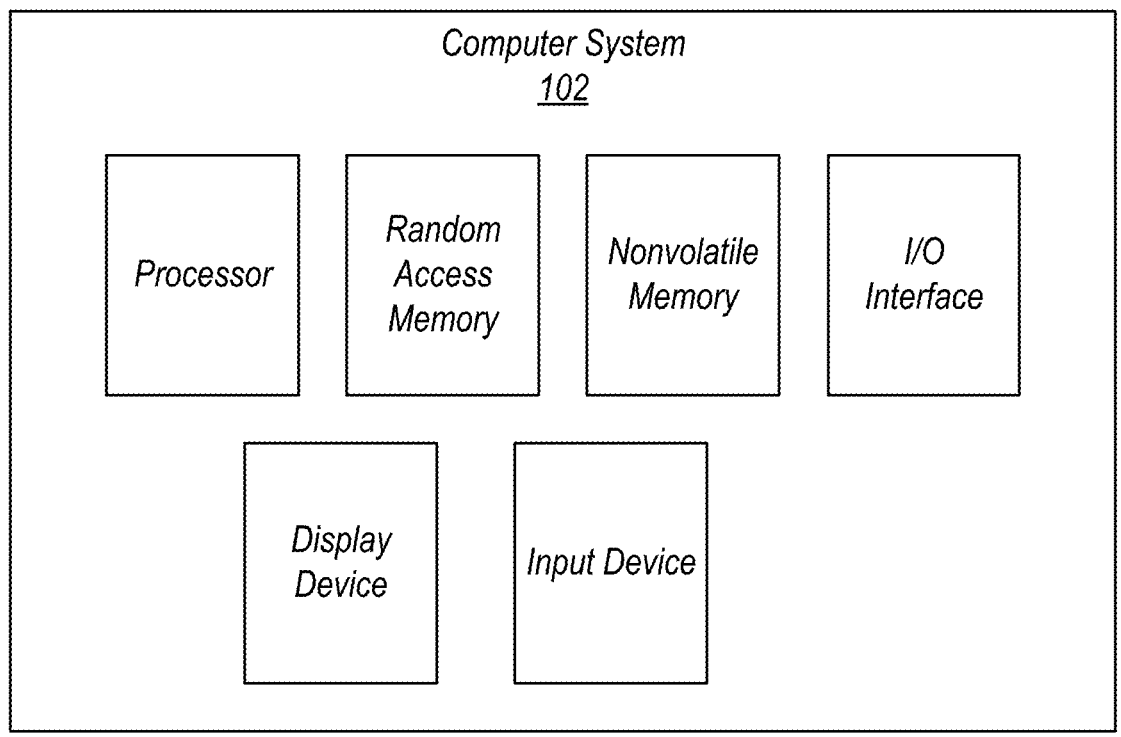
FIG. 2 shows a basic computer system block diagram, according to some embodiments.

FIG. 2 illustrates a computer system 102 that may include a processor, random access memory (RAM), nonvolatile memory, a display device, an input device and an I/O interface for coupling to the testing apparatus 104. For example, the computer system 102 may include at least one memory medium on which one or more computer programs or software components according to one embodiment of the present invention may be stored. For example, the memory medium may store one or more programs that are executable to perform the methods described herein. The memory medium may also store operating system software, as well as other software for operation of the computer system. Various embodiments further include receiving or storing instructions and/or data implemented in accordance with the foregoing description upon a carrier medium.

As shown, the computer system 102 may include a processor that is coupled to a random access memory (RAM) and a nonvolatile memory. The computer system 102 may also comprise an input device for receiving user input and a display device for presenting output. The computer 102 may also comprise an Input/Output (I/O) interface that is coupled to the testing apparatus 104. The I/O interface may be configured to supply signals to the DUT via the testing apparatus 104 to selectively stimulate the antennas on the DUT to generate electromagnetic radiation. The I/O interface may further be coupled to the dual polarization measurement antenna (e.g., either directly or via the testing apparatus) and configured to receive electromagnetic signals measured by the dual polarization measurement antenna.

The testing apparatus 104 may comprise a structure designed to receive a device under test (DUT). The DUT may be an antenna array chip, e.g., a chip which comprises a plurality of antennas, each antenna for generating electromagnetic radiation. The DUT may also be a user equipment, such as a cell phone, or other chip or device that has one or more antennas. The testing apparatus may also comprise a PAS designed to be placed proximate to the DUT for measuring electromagnetic signals produced by the plurality of antennas of the DUT. These measured electromagnetic signals are preferably not far-field signal measurements, and in some embodiments are near field (NF) measurements. The computer system 102 may be coupled to provide one or more stimulus signals to the DUT to selectively cause the various antennas to produce electromagnetic radiation. The polarized receiver antenna(s) may be configured to measure the NF electromagnetic signals produced by the antennas of the DUT and may provide these measured NF electromagnetic signals to the computer system 102 for processing.

Modulated Measurements on Dual Polarization Signals OTA without Manual Rotation

Polarization of wireless signals may be linear, circular, or elliptical with different orientations. All forms of polarization may be completely expressed with respect to two orthogonal component vectors. In the far field, these component vectors may be aligned in the plane orthogonal to the direction of wave propagation. Antenna design and excitation determines the polarization of the radiated fields. A transmission antenna may be dual-polarized, in which case it may be able to transmit two orthogonal polarizations and offer two ports to drive each of these polarizations independently. For dual linearly polarized antennas, it is common to designate one polarization dimension the horizontal (H) and the other one the vertical (V) polarization where this designation is arbitrary but typically inspired by the nominal orientation of the antenna and, thus, the polarization planes, in space.

When a receiver antenna picks up energy from an impinging electromagnetic wave, the fields' polarization may not be matched with the receiving antenna's designed polarization planes. Determining the full polarization properties of the incoming wave—or of the antenna that created the wave—may be accomplished either through perfect alignment of the polarization planes of the transmitting and receiving antennas or by observing and adequately combining the signals from the orthogonally polarized planes of a dual-polarized receiver antenna. While the method of perfectly aligning antennas is at the root of the state-of-the-art implementations, embodiments herein implement the latter approach of coherently combining signals from the two orthogonal polarizations of the receiving antenna.

Embodiments herein present systems and methods to perform modulated measurements on dual polarization signals OTA while avoiding any rotation of the measurement antenna or the DUT. In current implementations, the measurement antenna is typically rotated by an appropriate amount to align with the DUT. This process is very simple but requires very good mechanical tolerances to make sure the measurement antenna is exactly at the desired angle (e.g., 45°, or another alignment angle). If other angles are desired, a motor may be added to the antenna which can turn with high precision. In many cases, the measurement test sequence involves multiple different angles for the orientation. This physical movement causes delays and may increase measurement uncertainty, as the antenna should remain on the same location, for example on compact antenna test ranges (CATR). FIG. 1A illustrates a typical OTA DUT measurement setup.

Figure 3A:
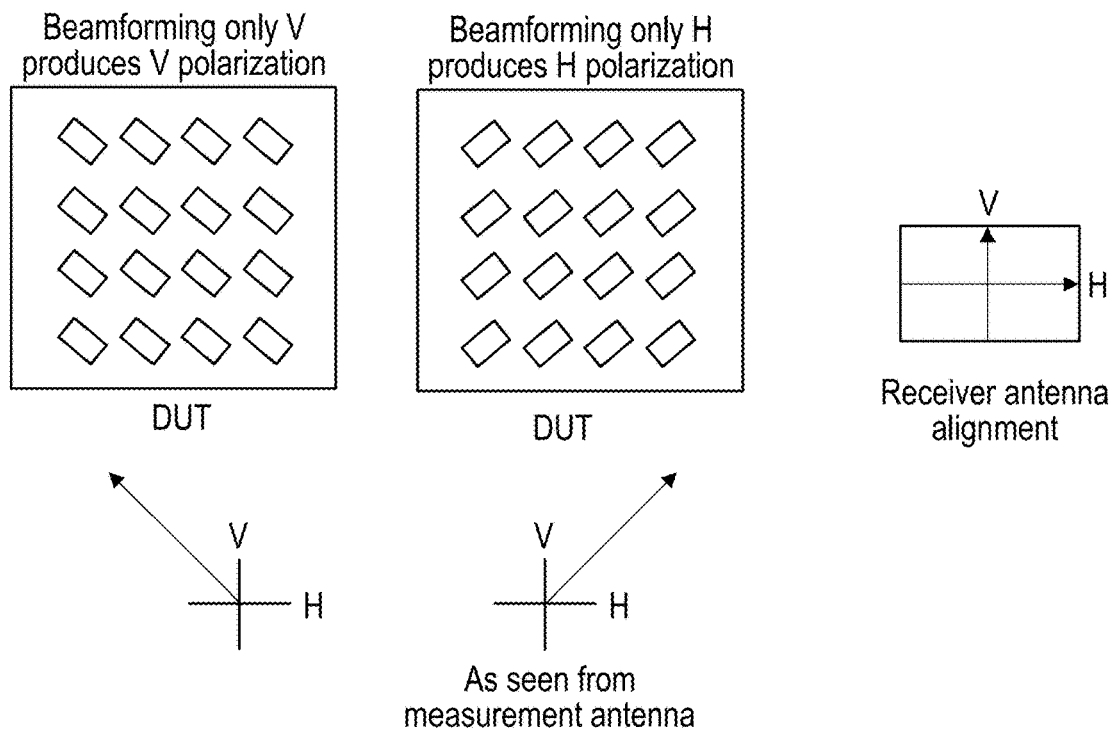
FIGS. 3A-B illustrate manually rotating a receiver to align with a polarized DUT transmission, according to the prior art.
Figure 3B:
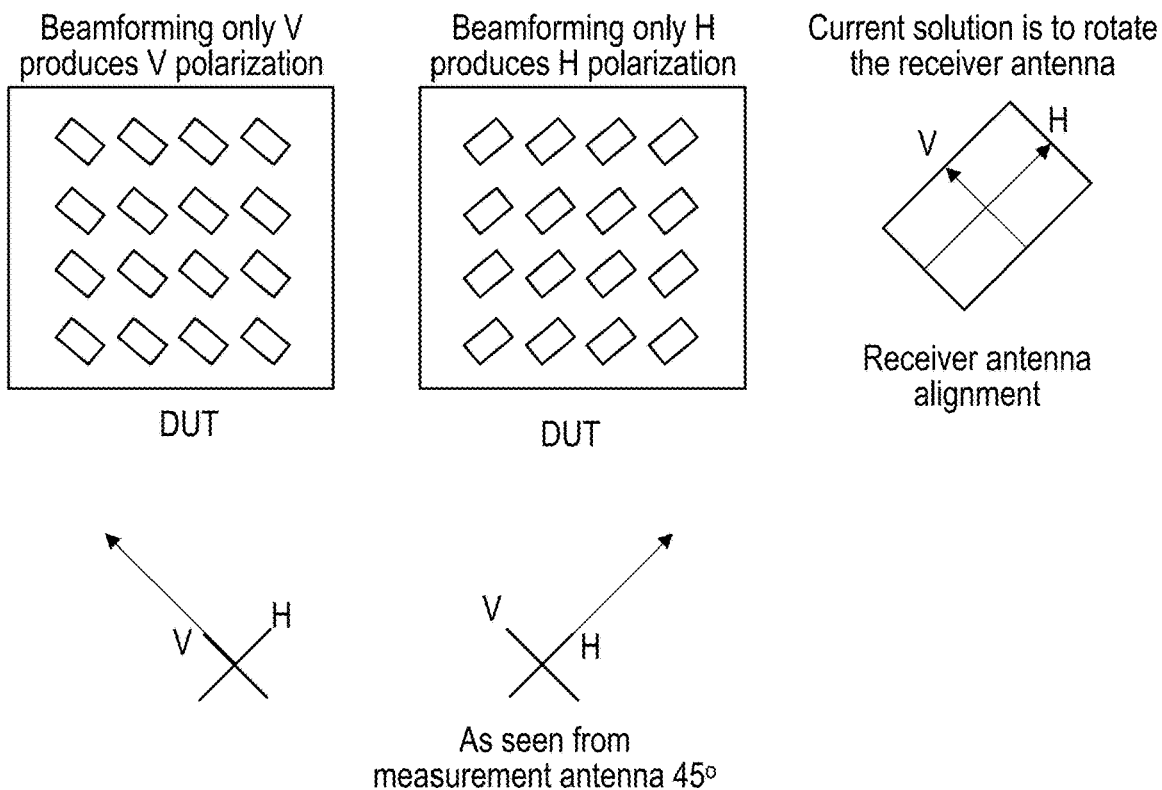

Dual-polarization DUTs may have various orientations for their antennas, for example, +/−450 as shown in the antenna array illustrated in FIGS. 3A and 3B. As shown, the DUT may have a first array of antenna elements polarized at −450 from the vertical and a second array of antenna elements polarized at +450 from the vertical, where both arrays are configured to coherently transmit the same signal at their two respective polarizations. Depending on the relative transmission strengths of the first and second arrays, the aggregate transmitted signal (which is a sum of transmissions from both arrays) may have any desired polarization. For example, the aggregate signal may be polarized at −450 when the first array transmits at full power and the second array does not transmit (as shown in the left DUT in both FIGS. 3A and 3B). Alternatively, the aggregate signal may be polarized at +45° when the second array transmits at full power and the first array does not transmit (as shown in the right DUT in both FIGS. 3A and 3B). If the receiver antennas are aligned vertically and horizontally as shown in FIG. 3A, the H and V polarized receiver antennas will both see a signal that is polarized at 45θ away from their respective axes. In prior implementations, the receiver is typically rotated as shown in FIG. 3B to align the receiver antennas with the two polarization axes of the DUT.

If the second array transmission power of the DUT is increased slightly from zero, the aggregate signal will be polarized at an angle of a slightly smaller magnitude (e.g., −40°). In some embodiments, a relative phase may be introduced between transmissions from the two arrays to result in an aggregate signal with circular polarization. When both a relative phase and a difference in transmission strength is implemented between the two arrays, the aggregate signal will be elliptically polarized, etc. Current implementations typically rotate the DUT, the measurement antenna(s) or both to align their respective polarizations.

Current implementations have several shortcomings. For example, mechanical tolerances for rotating the measurement antenna and/or the DUT should be kept within a desired tolerance for every angle. This is possible but it takes time and effort to maintain these tolerances, especially when multiple angles are involved in the measurement sequence. In addition, some phased array antenna designs are dual polarized, i.e., there are two orthogonal polarization planes per patch antenna that may both be excited to produce an electrical field at a relative angle compared to the polarization of any of their individual antennas. In this scenario, the test system measurement antenna may rotate to more than one location to measure all aspects of the performance.

Embodiments herein address these and other issues by measuring properties of the vertical (V) and horizontal (H) polarizations of a DUT regardless of whether the measurement antenna's polarization planes are aligned with the DUT polarization planes, thereby avoiding the difficulties that arise from performing manual rotations of the measurement antennas or the DUT. In some embodiments, coherent acquisitions of dual-polarized signals transmitted by a DUT are performed by V and H polarized measurement antennas (where V and H are measured according to the orientation axis of the measurement antennas). The acquired signals are then mathematically processed to determine the components of the dual-polarized signal that were transmitted by the V and H polarized transmit antennas of the DUT (where V and H for the DUT antennas are measured relative to the orientation of the DUT, which may be different from the orientation axis of the measurement antennas) before performing measurement analysis on the processed data.

In order to extract the components of the received signal that were transmitted by the V- and H-polarized TX antennas of the DUT, the signals received by the V- and H-polarized RX antennas of the measurement device should be received coherently. In other words, the signals received by the V- and H-polarized RX antennas of the measurement device should have a known phase relationship, so that they may be coherently combined. This may be accomplished in one of two ways, in various embodiments, by dual channel coherent acquisition or by single channel time duplex coherent acquisition. Each of these alternatives is explained in greater detail below.

Figure 4A:
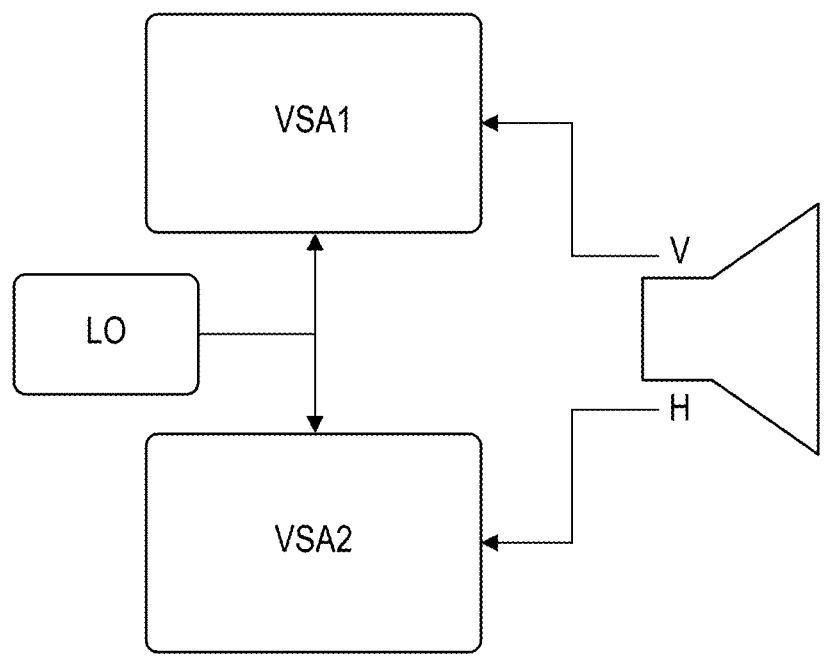
FIG. 4A illustrates a setup for dual-channel coherent signal acquisition, according to some embodiments.

FIG. 4A is a schematic diagram illustrating a setup for performing dual channel coherent acquisition, according to some embodiments. As illustrated, V- and H-polarized RX antennas of the measurement device are configured to simultaneously receive a dual-polarized signal transmitted by the DUT and provide their respective received signals to a respective vector signal analyzer (VSA), VSA1 and VSA2. Each of VSA1 and VSA 2 are driven by the same local oscillator (LO) to ensure coherence between the two VSAs. Advantageously, this setup provides a faster way to acquire both signals as there is a dedicated channel for each port of the antenna. However, a tradeoff for this setup is the additional cost of having two channels with two respective VSAs. Additionally, all of the electrical components in between the antenna and the VSAs (e.g., the cables) should be either equal to ensure sure that amplitude and phase distortions are equal for both the V and H signals, or they should have a known phase delay and/or amplitude distortion between them so that discrepancies in amplitude and phase between the two channels may be accommodated for. Phase delay and/or amplitude distortion may be accommodated for through a calibration process, as described in greater detail below.

Figure 4B:
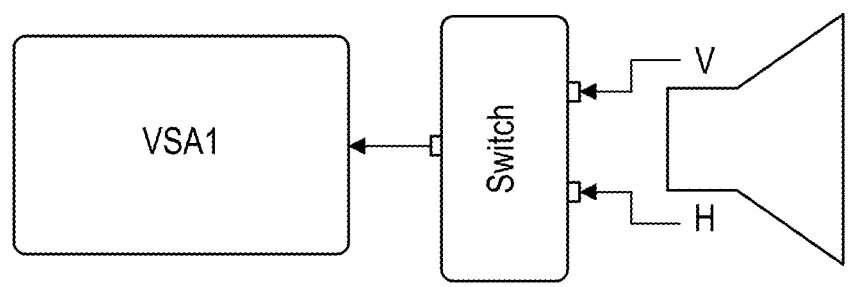
FIG. 4B illustrates a setup for single-channel time-duplexed coherent signal acquisition, according to some embodiments.

FIG. 4B is a schematic diagram illustrating a setup for performing single channel time duplex coherent acquisition, according to some embodiments. In this setup, a single VSA is used and the V and H signals are acquired sequentially one after another. This method has the benefit of requiring only a single VSA channel, reducing costs. However, this method involves utilizing periodic DUT excitation and accurate alignment of the two sequential acquisition processes. Additionally, the measurement time is increased as the V and H measurements are not performed concurrently. To improve performance in this setup, it may be desirable to use high-quality switches with minimal switch impairments to phase and amplitude, so that phase drift in the time period between the V and H acquisitions is sufficiently small so that the acquisitions are coherent with each other.

Figure 5A:
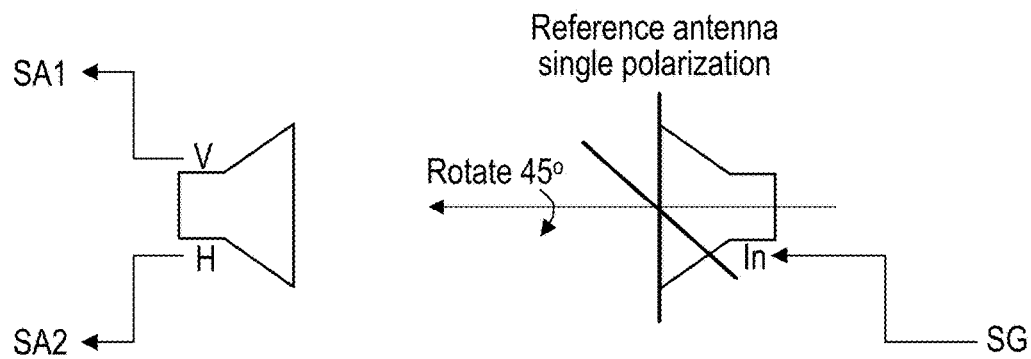
FIG. 5A illustrates a calibration process for dual-channel coherent signal acquisition, according to some embodiments.
Figure 5B:
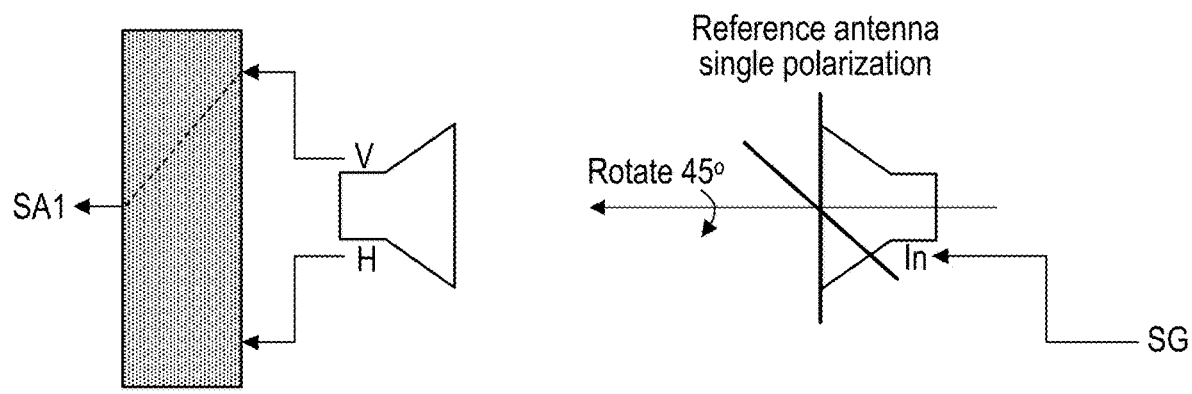
FIG. 5B illustrates a calibration process for single-channel time-duplexed coherent signal acquisition, according to some embodiments.

FIGS. 5A-B—Calibration Process

In both cases (i.e., either dual channel coherent acquisition or single channel time duplex coherent acquisition), a calibration process may be performed prior to DUT signal acquisition so that the setup does not add any distortions to the acquisitions that are different for the H and V polarized received signals, in some embodiments. The calibration process may involve generating a continuous waveform (CW) by a reference antenna that is transmitted to the measurement device. The phases and/or amplitudes of the CW tone received by each RX antenna and processed by the VSA(s) are computed and the phase and/or amplitude difference between them is calculated. FIG. 5A illustrates a calibration process for dual channel coherent acquisition, while FIG. 5B illustrates a calibration process for single channel time duplex coherent acquisition.

Processing the Coherent Acquisition

Figure 6A:
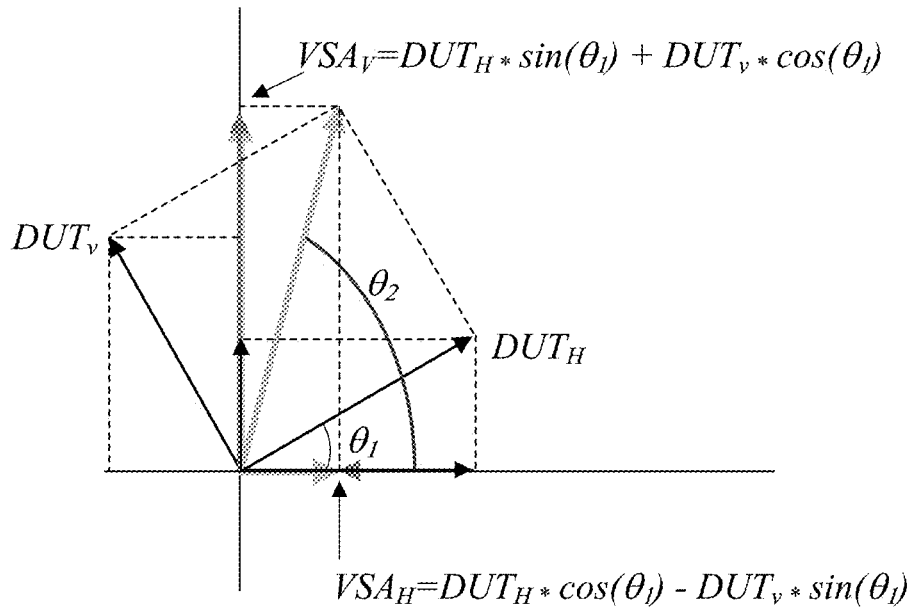
FIG. 6A illustrates components of a polarized transmission as seen from a measurement device, according to some embodiments.
Figure 6B:
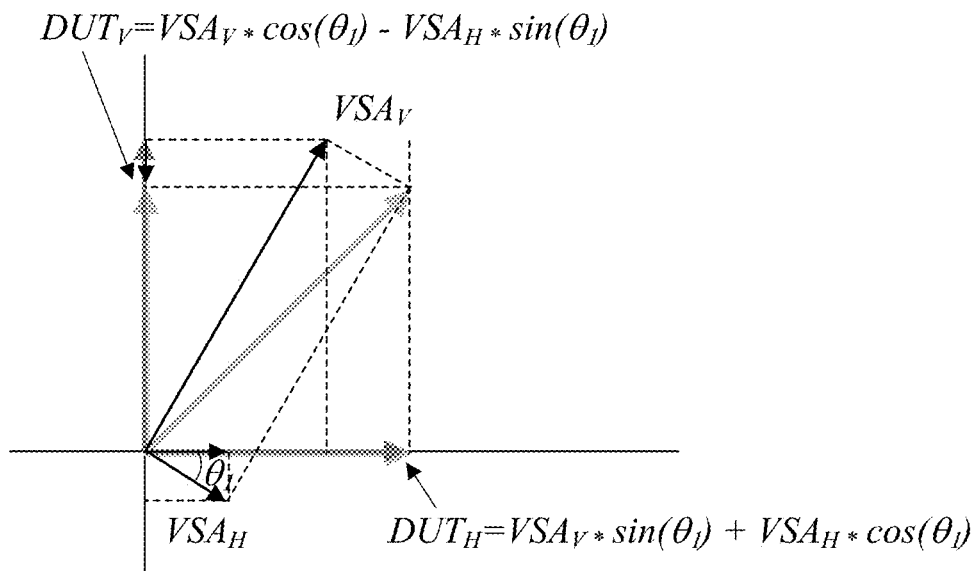
FIG. 6B illustrates components of a polarized transmission as seen by the transmitting DUT, according to some embodiments.

In the general case, the DUT and the measurement antennas may each feature two orthogonal polarizations but may have polarization misalignment by having an offset between their respective orientations by an angle $\theta_1$. The offset may be intentional, for instance to allow for easier mechanical handling, or may be due to alignment error. To correctly determine the properties of the DUT, in some embodiments the signals acquired by the V- and H-designated polarizations of the measurement antenna and analyzed by the vector signal analyzer (VSA), $VSA_V$ and $VSA_H$, respectively, are mapped to the signals originally radiated by the DUT along the V- and H-designated polarizations as seen from the DUT, $DUT_V$ and $DUT_H$, respectively. FIG. 6A illustrates the view from the measurement antenna and FIG. 6B shows the perspective of the DUT on the same field vector. The desired mapping is a transformation of the $VSA_V$ and $VSA_H$ coordinates to the $DUT_V$ and $DUT_H$ coordinates that depends on the angle $\theta_1$, where $\theta_1$ is the angle between the polarization axes of the DUT and the measurement device, and is given by $$DUT_H = VSA_V \cdot \sin\theta_1 + VSA_H \cdot \cos\theta_1 \quad (1)$$

$$DUT_V = VSA_V \cdot \cos\theta_1 - VSA_H \cdot \sin\theta_1 \quad (2)$$

For the special case of $\theta_1=45$ degrees, this becomes $$DUT_H = \frac{1}{\sqrt{2}}(VSA_V + VSA_H) \quad (3)$$

$$DUT_V = \frac{1}{\sqrt{2}}(VSA_V - VSA_H) \quad (4)$$

Figure 7:
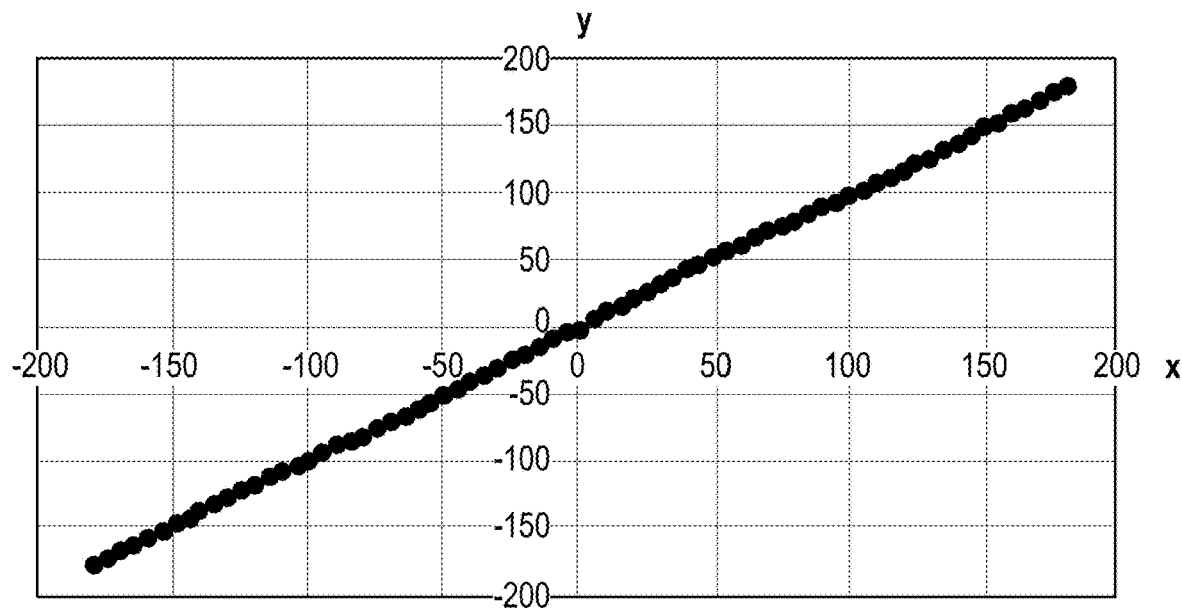
FIG. 7 illustrates experimental data for detecting the angle $\theta_1$, according to some embodiments.

The value of $\theta_1$ may be obtained from a calibration step where, e.g., a known DUT polarization state is measured, in some embodiments. For example, if it is known that the DUT radiates only on the H-polarization, $DUT_V=0$, and we may obtain the angle from $ANT_H$ and $ANT_V$ from evaluating $\cos\theta_1 = VSA_H/\sqrt{VSA_H^2+VSA_V^2}$ and $\sin\theta_1 = VSA_V/\sqrt{VSA_H^2+VSA_V^2}$. FIG. 7 illustrates experimental data for detecting the angle $\theta_1$. These expressions may also be used in a more general case when the DUT radiates with both its H- and V-polarization, with the understanding that in this case the angle $\theta_1$ will represent the angle between the H-polarized measurement antenna and the aggregate polarization angle of the combined signal transmitted by the DUT.

Once the setup is calibrated and coherent V and H RX signals are acquired, the following procedure may be performed to extract the signals transmitted by the V and H polarized TX antennas of the DUT. The signals acquired by the V- and H-polarized measurement antennas, $VSA_V$ and $VSA_H$, respectively, are defined as:

$$VSA_V = I_V + jQ_V \quad (5)$$

$$VSA_H = I_H + jQ_H \quad (6)$$

where the I and Q terms are the In-Phase and Quadrature Phase (i.e., the IQ data) of the baseband representation of the radio frequency (RF) signal. $VSA_H$ and $VSA_H$ are complex signals, and the process of addition may be performed as a vector sum in the complex plane.

The signal contributions due to the V- and H-polarized DUT antennas, $DUT_V$ and $DUT_H$, respectively, may be calculated from the acquired signals $VSA_V$ and $VSA_H$ based on the following equations (when $\theta_1 = 45$ degrees):

$$DUT_H = \frac{1}{\sqrt{2}}(I_V + I_H) + \frac{1}{\sqrt{2}}(Q_V + Q_H)j \quad (7)$$

$$DUT_V = \frac{1}{\sqrt{2}}(I_V - I_H) + \frac{1}{\sqrt{2}}(Q_V - Q_H)j \quad (8)$$

Where the perspective of the DUT orientation is now shifted based on both acquisitions.

$DUT_V$ and $DUT_H$ are complex IQ baseband representations of the V and H transmissions from the DUT and as seen from the DUT perspective (i.e., where V and H are measured relative to the orientation axis of the DUT). Modulated measurements may now be performed on $DUT_V$ and $DUT_H$ to find the modulated performance (e.g., error vector magnitude (EVM), adjacent channel leakage ratio (ACLR), etc.) for the DUT V and H polarizations, respectively. The relative angle, $\theta_2$, between the orientation axes of the measurement device and the aggregate signal transmitted by the DUT may also be determined according to the following expression:

$$\theta_2 = \tan^{-1}\frac{|VSA_V|}{|VSA_H|} \quad (9)$$

Calculating Error Vector Magnitude (EVM)

Figure 8:
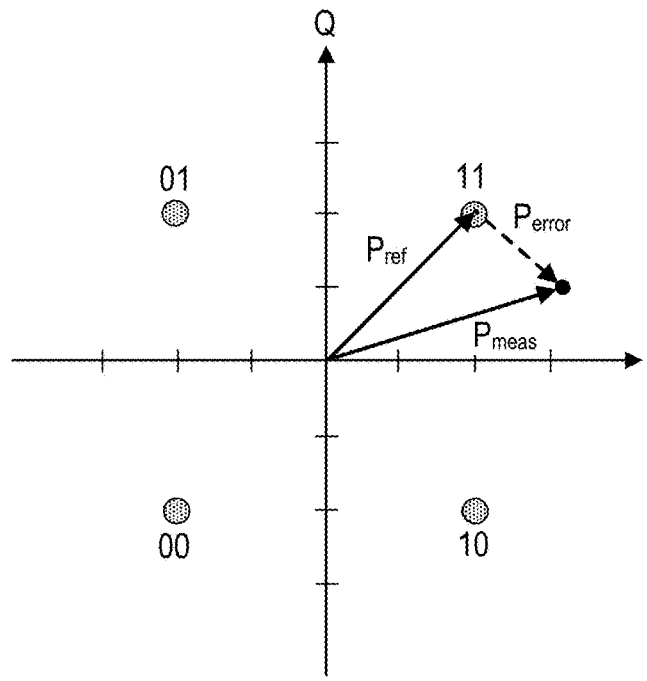
FIG. 8 illustrates an error vector magnitude (EVM) for a quadrature amplitude modulation (QAM) encoding scheme, according to some embodiments.

Error Vector Magnitude (EVM) is a measurement of digital accuracy of a transmitter. The EVM is defined as the root mean squared error normalized to the root of the ideal symbol power, and this number represents a degree of accuracy of the transmitter:

$$EVM(\text{rms}) = \sqrt{\frac{\frac{1}{N}\sum_{n=1}^{N}|S_{ideal,n} - S_{meas,n}|^2}{\frac{1}{N}\sum_{n=1}^{N}|S_{ideal,n}|^2}}, \quad (10)$$

where $S_{ideal,n}$ is the ideal signal (i.e., the reference signal), $S_{meas,n}$ is the measured signal (i.e., the reproduced polarized transmission), and n is summed over the N signals of the IQ baseband signal. FIG. 8 illustrates an example of an EVM for a four-constellation quadrature amplitude modulation (QAM) encoding scheme. As illustrated, $P_{ref}$ is the reference signal vector for the (1,1) constellation point, $P_{means}$ is the measured signal vector, and the difference between them, $P_{error}$, is the error vector. The magnitude of the error vector is the EVM measurement result.

When each IQ signal is received in each antenna, $VSA_V$ and $VSA_H$ acquisitions are obtained. The corresponding EVMs are computed in each of the channels in a normal situation:

$$VSA_{V\%EVM}(\text{rms}) = \sqrt{\frac{\frac{1}{N}\sum_{n=1}^{N}|S_{ideal,n} - VSA_{V,n}|^2}{\frac{1}{N}\sum_{n=1}^{N}|S_{ideal,n}|^2}} \times 100\% \quad (11)$$

$$VSA_{H\%EVM}(\text{rms}) = \sqrt{\frac{\frac{1}{N}\sum_{n=1}^{N}|S_{ideal,n} - VSA_{H,n}|^2}{\frac{1}{N}\sum_{n=1}^{N}|S_{ideal,n}|^2}} \times 100\% \quad (12)$$

These EVMs cannot be simply summed together to get the DUT performance as the mapping between the measured signals $VSA_V$ and $VSA_H$ is not linear. An example where this fails is to add them when the transmitted signal is perfectly aligned in polarization with either V or H. In this case, one RX antenna will have a good EVM while the other will have a poor (potentially non-computable) EVM and summing them will reduce the perceived performance of the DUT. Thus, when the $DUT_H$ and $DUT_V$ are computed, the correspondent EVM would be:

$$DUT_{H\%EVM}(\text{rms}) = \sqrt{\frac{\frac{1}{N}\sum_{n=1}^{N}|S_{ideal,n} - DUT_{H,n}|^2}{\frac{1}{N}\sum_{n=1}^{N}|S_{ideal,n}|^2}} \cdot 100\% \quad (13)$$

$$DUT_{V\%EVM}(\text{rms}) = \sqrt{\frac{\frac{1}{N}\sum_{n=1}^{N}|S_{ideal,n} - DUT_{V,n}|^2}{\frac{1}{N}\sum_{n=1}^{N}|S_{ideal,n}|^2}} \cdot 100\% \quad (14)$$

To properly measure EVM, the IQ baseband signal of the DUT transmitter is first reconstructed from H and V measurement channels. Directly adding the baseband IQ of the H and V channels may lead to an incorrect EVM calculation. For example, when the transmitter is aligned close to the H polarization of the measurement antenna, the H channel data has roughly the same EVM as the transmitter, while the V channel data contains mostly noise. If the two channels are added equally, the sum will contain more noise power, hence the measured EVM will be worse than true EVM.

To address this issue, a weighted sum of H and V channel data is performed, where the weight is a function of the rotation angle θ between the polarization of the signal and the measurement antenna.

Figure 9:
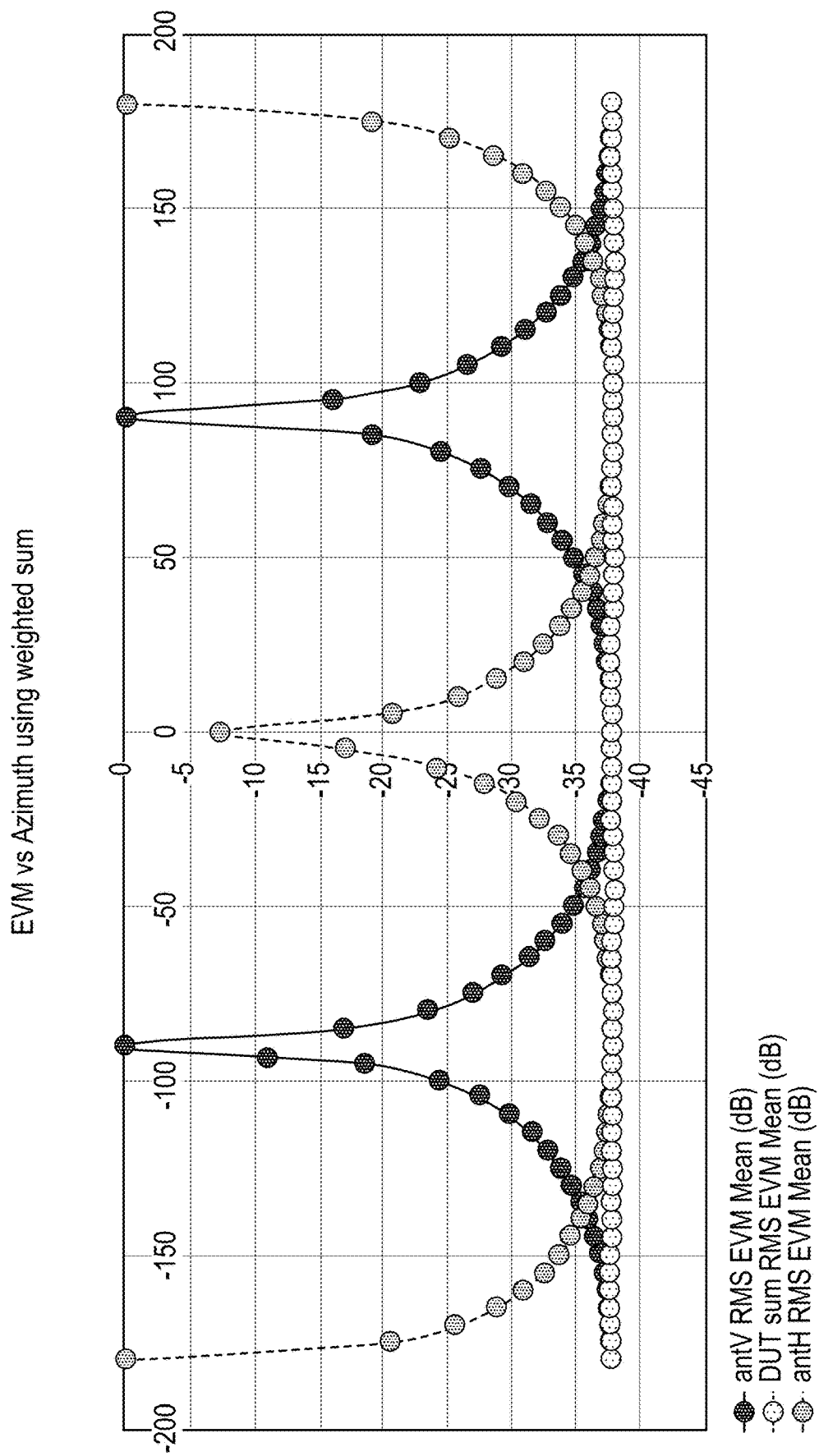
FIG. 9 illustrates experimental data for the EVM as a function of angle for the vertically polarized receiver antenna, the horizontally polarized receiver antenna, and a coherent combination of both, according to some embodiments.

FIG. 9 is a plot of experimental data for the calculated EVM using the V-polarized measurement antenna only, the H-polarized measurement antenna only, and the coherent combination of both measurement antennas, according to some embodiments. The illustrated data was acquired for a 30 GHz acquisition frequency with a 5G NR 100 MHz DUT TX signal. As illustrated, the EVM calculated using only a V- or H-polarized measurement antenna in isolation is susceptible to the orientation of the antenna. However, when both measurement antennas are used and their respective signals are coherently combined, the calculated EVM is more steady and less sensitive to the relative orientation of the measurement device and the DUT.

In some embodiments, other measurements besides EVM may be determined using the described methods, such as Bluetooth™ Delta F1 and Delta F2, or Gaussian minimum-shift (GMS) phase and frequency errors, among other possibilities.

FIGS. 10A-D EVM Measurements for Beamforming

Figure 10A:
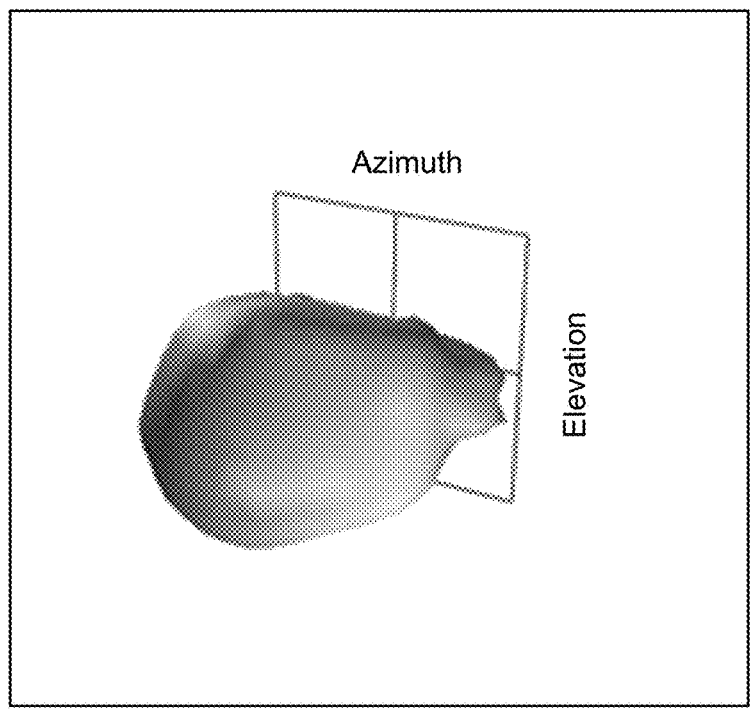
FIGS. 10A-D illustrate beamforming patterns for polarized signals received from a DUT and coherently combined, according to some embodiments.
Figure 10B:
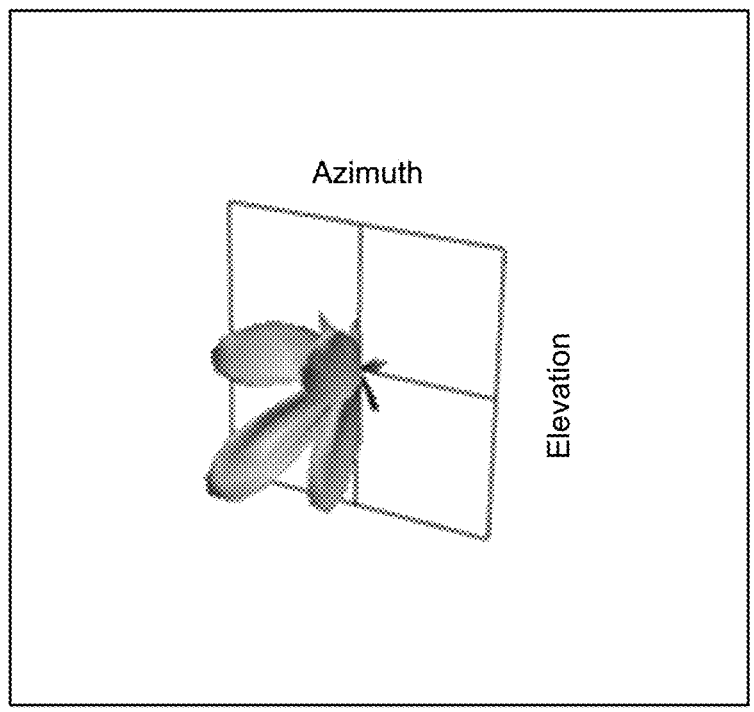
Figure 10C:
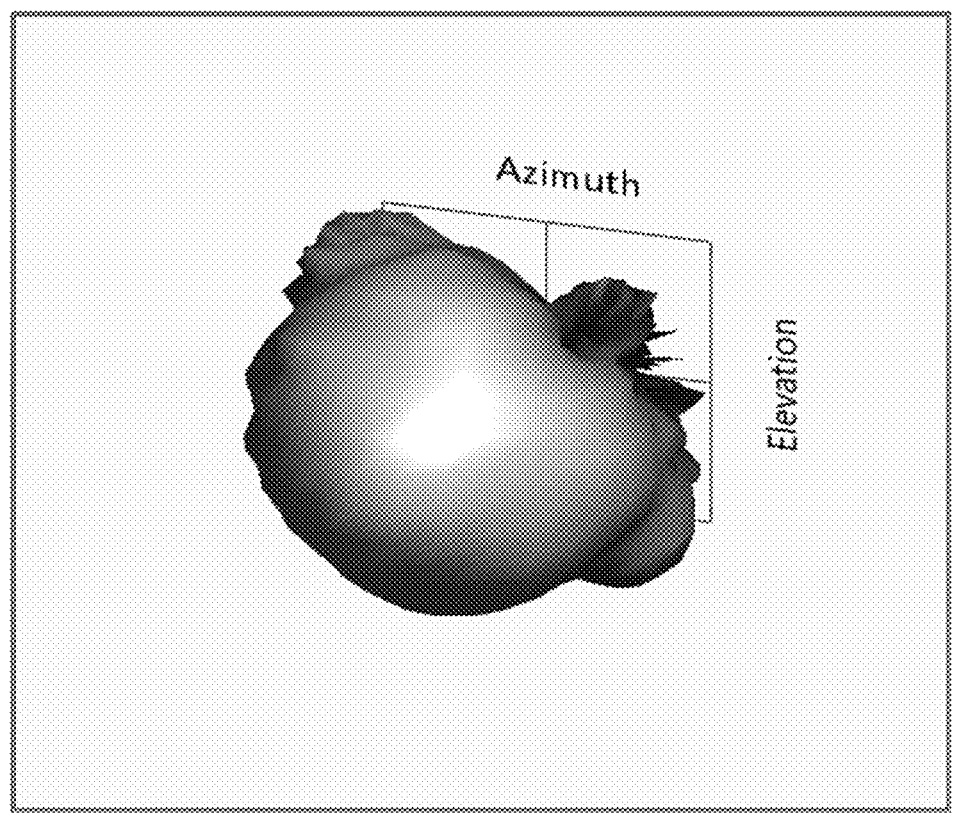
Figure 10D:
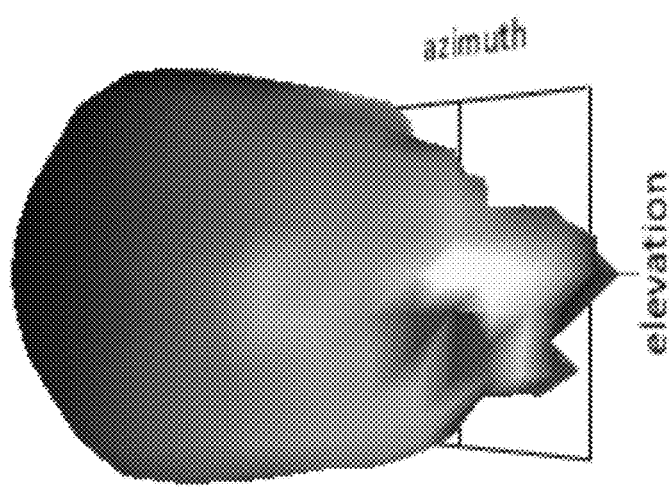

In some embodiments, multiple modulated measurements are made over a spherical grid around the DUT to create a beamformer antenna pattern. FIGS. 10A and 10B illustrate received power as a function of angle for horizontally and vertically polarized receiver antennas, respectively. These two beamforming patterns may be coherently combined to form the main antenna pattern, as illustrated in FIG. 10C. The pattern shown in FIG. 10C looks similar to the pattern shown in FIG. 10A because, in this particular example, the transmitted signal is closely aligned with the polarization plane of the vertically polarized receiver antenna. Based on the beamforming pattern shown in FIG. 10C and an idealize beamforming pattern for the transmitter, a plot of EVM vs. angle may be obtained, as shown in FIG. 10D.

Figure 11:
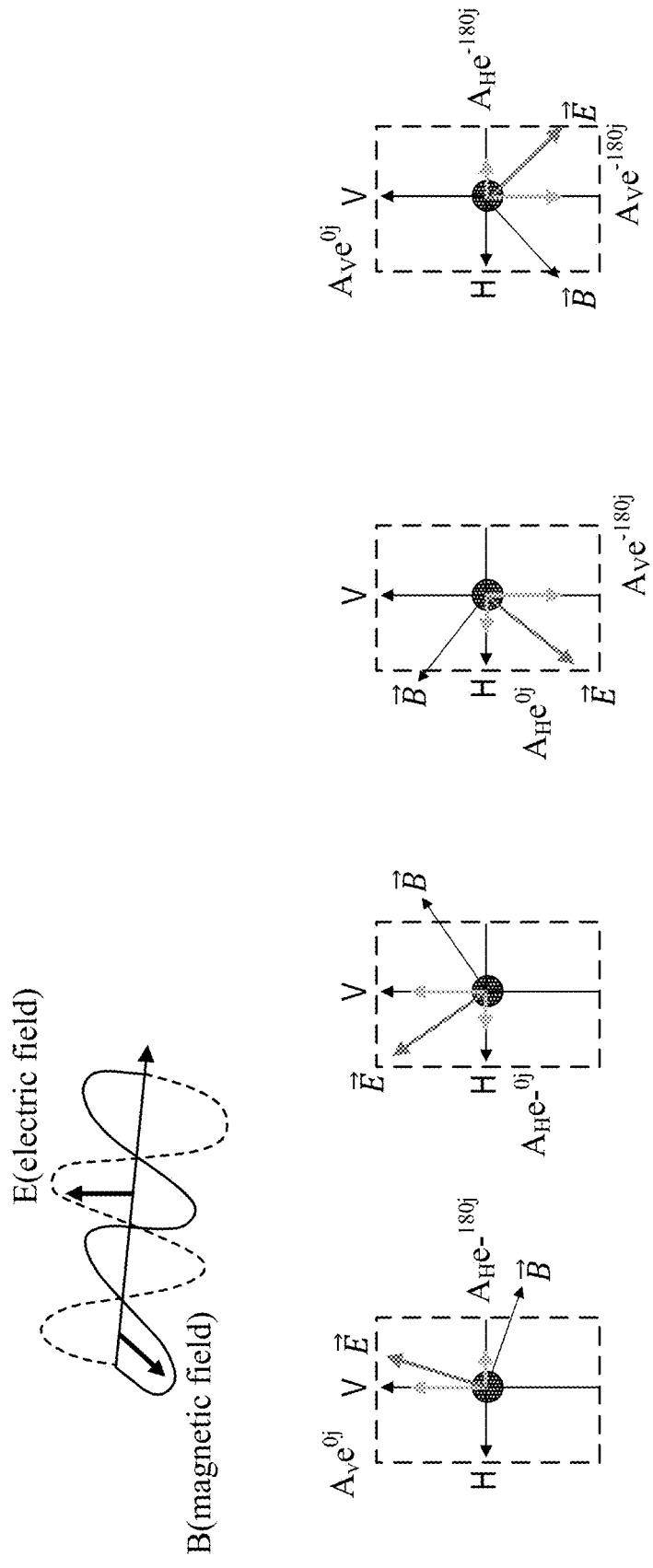
FIG. 11 illustrates the phase of a received field in each of four different quadrants, according to some embodiments.
Figure 12:
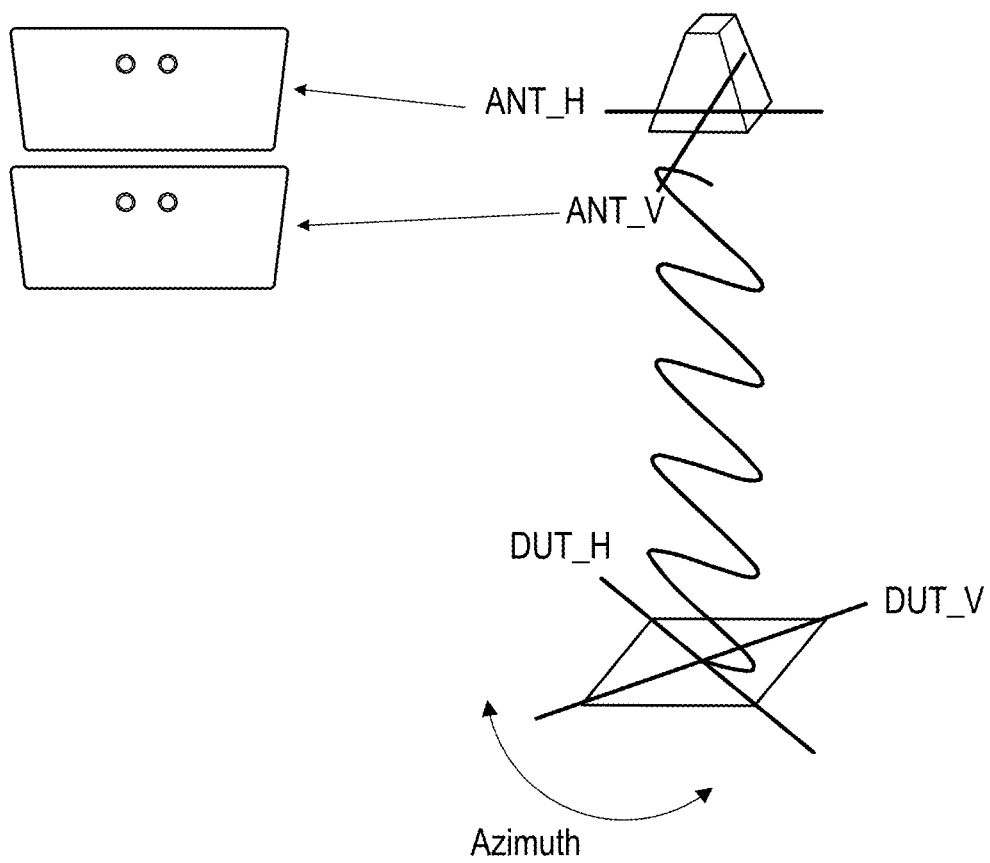
FIG. 12 illustrates how a transmission from a DUT may be rotated to different quadrants, according to some embodiments.

While performing measurements to construct a beamforming pattern, the DUT may rotate so that the receiver antennas receive the transmission from different quadrants. When an antenna rotates across a quadrant boundary, it is possible that the phase of the signal flips completely, as shown in FIG. 11. This means that a coherent signal acquisition will suddenly experience a 180° change of the phase. This happens as the electric fields arrive at different phases to V and H as the polarization of the transmitted signal rotates, as shown in FIG. 12. Accordingly, the apparent phase offset between V and H will flip in different quadrants. To accommodate the flip that occurs when crossing a quadrant boundary, in some embodiments the quadrant position of the DUT is pre-programmed based on how the receiver antennas and the DUT have been placed in the anechoic chamber and how the DUT will be rotated throughout signal acquisition. Once it is known what quadrant the DUT will transmit from throughout the signal acquisition process, it may be determined which received signals will experience a 1800 shifted or not shifted phase, and these phase shifts may then be removed prior to analysis and the EVM calculation. In some embodiments, the orientation quadrant of the DUT may be determined directly throughout the signal acquisition process with a constant emission.

Figure 13:
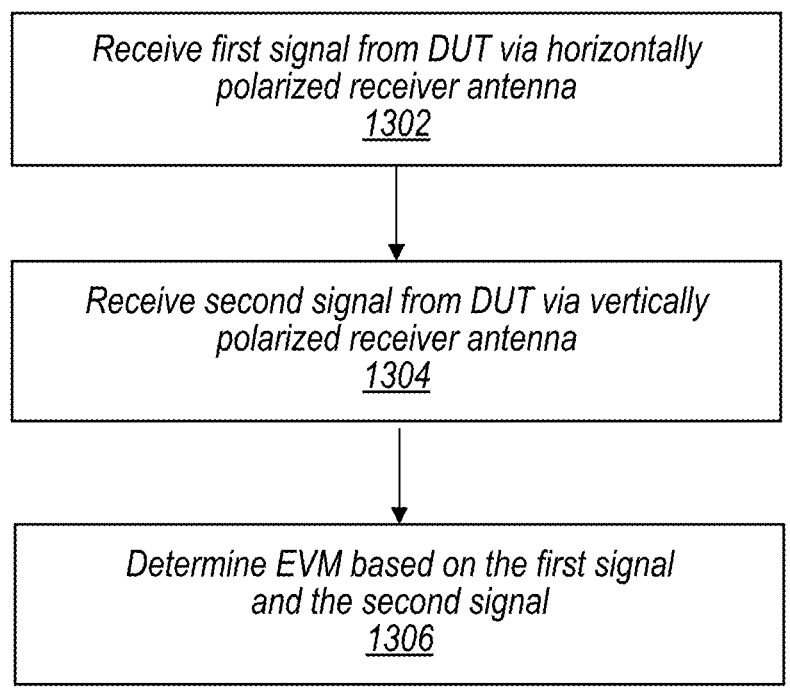
FIG. 13 is a flowchart diagram illustrating a method for determining an EVM of a polarized transmission by combining two cross-polarized coherent signals, according to some embodiments.

FIG. 13—Flowchart for Determining EVM with Dual-Polarized Measurement Antennas

FIG. 13 is a flowchart diagram illustrating a method for determining an EVM value of a DUT using dual-polarized measurement antennas, according to some embodiments. The method described in FIG. 13 may be performed by a DUT measurement system including a processor coupled to a non-transitory computer-readable memory medium, where the processor is configured to provide instructions to and receive signals from the DUT and a dual-polarized measurement device. The processor may direct the DUT to transmit one or more transmissions and/or may direct rotation of the DUT to a plurality of orientations. The processor may receive signals from each of a horizontally and a vertically polarized measurement antenna, and determine an EVM from a coherent combination of these signals, as described in greater detail below. While the methods described in reference to FIG. 13 include embodiments where a DUT transmits a polarized signal to a receiver or measurement antenna, in some embodiments an EVM measurement may be performed for one or more polarized receiver antennas of a DUT. For example, a calibrated polarized signal may be transmitted to the DUT, the DUT may receive the signal via two cross-polarized receiver antennas, and an EVM of the measurement may be calculated based on the received signals.

In various embodiments, some of the elements of the methods shown may be performed concurrently, in a different order than shown, may be substituted for by other method elements, or may be omitted. Additional method elements may also be performed as desired. As shown, the method may operate as follows.

At 1302, a first signal transmitted by a device-under-test (DUT) is received via a horizontally polarized receiver antenna. In some embodiments, the DUT is a dual-polarized antenna configured to transmit a wireless signal with an adjustable polarization.

At 1304, a second signal transmitted by the DUT is received via a vertically polarized receiver antenna, where the second signal is coherent with the first signal.

In some embodiments, the polarized transmission from the DUT is polarized at an angle (potentially unknown) that is unaligned with the polarization axes of the horizontally polarized receiver antenna and/or the vertically polarized receiver antenna. The DUT, the horizontally polarized receiver antenna and the vertically polarized receiver antenna may be positioned within an anechoic chamber for DUT signal measurement and characterization. The horizontally and vertically polarized receiver antennas may be collocated within a measurement device.

In some embodiments, the horizontally polarized receiver antenna and the vertically polarized receiver antenna are coupled to separate first and second vector signal analyzers (VSAs), respectively. The first and second VSAs may share a single local oscillator, which may enable the horizontally and vertically polarized receiver antennas to receive signals that are coherent with each other in phase. The first and second signals may be concurrently received from a single transmission by the DUT. For example, the DUT may transmit a single polarized transmission that is received by each of the two cross-polarized antennas to produce the first and second signals.

In other embodiments, the horizontally polarized receiver antenna and the vertically polarized receiver antenna are coupled through a switch to a vector signal analyzer (VSA), and the first and second signals are received from two respective sequential transmissions by the DUT in a time-duplexed manner. In these embodiments, toggling the switch switches whether the horizontally polarized receiver antenna or the vertically polarized receiver antenna is connected to the VSA. The two sequential transmissions may be transmitted sufficiently close to each other in time so that they are coherent with each other. In other words, they may be transmitted by the DUT using a common local oscillator such that the two transmissions have a definite phase relationship, which may be used to coherently combine the first and second signals.

At 1306, an error vector magnitude (EVM) of a polarized transmission from the DUT is determined based at least in part on the first signal and the second signal. In some embodiments, the EVM is determined by coherently combining the first and second signals to reproduce the polarized transmission from the DUT, and taking a difference between the reproduced polarized transmission and a reference signal, e.g., as shown in Equation 10 above.

The DUT may be configured to transmit signals with an adjustable polarization, for example, by transmitting the same signal with two cross-polarized transmit antennas, and modifying the relative transmission power of each antenna. Regardless of the polarization axis of the transmitted signal, coherently combining the first and second signals received by the horizontally and vertically polarized receiver antennas may advantageously reconstruct the polarized transmission without manually aligning the receiver to the DUT transmission polarization axis. In some cases, the DUT may be rotated through a plurality of orientations, and previous implementations would manually rotate the receiver to be properly aligned with the DUT for each orientation. Embodiments herein improve on these methods by utilizing cross-polarized receiver antennas to coherently receive cross-polarized signals that may be combined to reconstruct the polarized transmission and determine the EVM.

In some embodiments, one or both of a global system for mobile communications (GSM) phase and a frequency error of the transmissions from the DUT is determined based on the polarized transmission that is reconstructed from the first signal and the second signal.

In some embodiments, the method includes rotating the DUT to each of a plurality of orientations, repeating the EVM calculation for transmissions from each orientation, and producing a beamforming map of EVM values for the DUT based on the determined EVMs at each orientation, as shown in FIGS. 10A-D. For the example, the DUT may transmit a respective transmission from each respective orientation, and the respective transmissions may each be received via the vertically polarized receiver antenna and the horizontally polarized receiver antenna. The EVMs may then be determined based on the transmissions received via the vertically and horizontally polarized receiver antennas. A beamforming map such as that illustrated in FIG. 10D may then be produced, and presented on a display.

In some embodiments, a calibration process is performed prior to receiving the first and second signals by the horizontally and vertically polarized receive antennas, respectively. The calibration process may include one or both of a phase calibration process and an amplitude calibration process. The phase calibration process may proceed by transmitting, by a reference antenna, a continuous waveform (CW) signal polarized at an angle between the horizontally polarized receiver antenna and the vertically polarized receiver antenna. The CW signal is separately received by each of the horizontally and vertically polarized receiver antennas to produce first and second calibration signals, respectively. A phase difference is determined between the first and second calibration signals; and the determined phase difference is corrected for to calibrate the horizontally polarized receiver antenna and the vertically polarized receiver antenna. For example, the first and second signals that are used to determine the EVM may be phase modified to remove the determined phase difference.

In some embodiments, an amplitude calibration process is implemented by transmitting, by a reference antenna, a CW signal that is polarized with the horizontally polarized receiver antenna. The first CW signal is received by the horizontally polarized receiver antenna to produce a first calibration signal. A second CW signal that is polarized with the vertically polarized receiver antenna is transmitted by the reference antenna and received by the vertically polarized receiver antennas to produce a second calibration signal. An amplitude difference between the first and second calibration signals is determined and used to calibrate the horizontally polarized receiver antenna and the vertically polarized receiver antenna. For example, the first and second signals that are used to determine the EVM may be amplitude modified to remove the determined amplitude difference.

In some embodiments, an orientation quadrant of the DUT is determined, and it is then determined whether to flip a sign of one or both of the first and second signals based at least in part on the determined orientation quadrant of the DUT. When constructing a beamforming pattern, the sign of one or both of the first and second signals may be flipped when the DUT angle is rotated across a quadrant boundary, depending on whether crossing the quadrant boundary results in a 180° phase shift in the respective signal as shown in FIG. 11.

Embodiments of the present disclosure may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a computing device may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure. It is intended that the following claims be interpreted to embrace all such variations and modifications.

The invention claimed is:

1. A method, comprising:
performing, by a dual-polarized measurement system comprising a vector signal analyzer configured to acquire and process a first signal and a second signal:
receiving the first signal that is associated with a first transmitted signal transmitted by a device-under-test (DUT), the first signal received via a horizontally polarized receiver antenna;
receiving the second signal that is associated with a second transmitted signal transmitted by the DUT, the second signal received via a vertically polarized receiver antenna,
wherein the first signal and the second signal are received without rotation, with respect to the DUT, of at least one of the horizontally polarized receiver antenna or of the vertically polarized receiver antenna; and
determining an error vector magnitude (EVM) of a polarized transmission from the DUT, the polarized transmission comprising the first transmitted signal and the second transmitted signal, wherein the EVM is determined based at least in part on the first signal and the second signal.

2. The method of claim 1,
wherein determining the EVM of the polarized transmission from the DUT based at least in part on the first signal and the second signal comprises:
coherently combining the first and second signals to reproduce the polarized transmission from the DUT; and
determining the EVM of the polarized transmission based at least in part on a difference between the polarized transmission and a reference signal.

3. The method of claim 1,
wherein the polarized transmission from the DUT is polarized at an angle that is unaligned with the horizontally polarized receiver antenna and the vertically polarized receiver antenna.

4. The method of claim 1, further comprising:
for each respective orientation of a plurality of orientations of the DUT:
transmitting, by the DUT, a respective transmission from the respective orientation;
receiving the respective transmission via the vertically polarized receiver antenna and the horizontally polarized receiver antenna; and
determine a respective EVM of the respective transmission based at least in part on the transmissions received via the vertically and horizontally polarized receiver antennas; and
producing a beamforming map based on the respective EVMs of the respective transmissions.

5. The method of claim 1,
wherein the DUT comprises a dual-polarized antenna, wherein the dual-polarized antenna is configured to transmit with an adjustable polarization.

6. The method of claim 1,
wherein the horizontally polarized receiver antenna and the vertically polarized receiver antenna are coupled to first and second vector signal analyzers (VSAs) of the vector signal analyzer, respectively, and wherein the first and second VSAs share a single local oscillator, and
wherein the first and second signals are concurrently received from a single transmission by the DUT.

7. The method of claim 1,
wherein the horizontally polarized receiver antenna and the vertically polarized receiver antenna are coupled through a switch to the vector signal analyzer (VSA),
wherein toggling the switch switches whether the horizontally polarized receiver antenna or the vertically polarized receiver antenna is connected to the VSA; and
wherein the first and second signals are received in a time duplexed manner from sequential transmissions by the DUT.

8. The method of claim 1, further comprising:
determining one or both of a global system for mobile communications (GSM) phase and a frequency error of the transmissions from the DUT based on the first signal and the second signal.

9. The method of claim 1, further comprising:
performing a phase calibration process by:
transmitting, by a reference antenna, a continuous waveform (CW) signal polarized at an angle between the horizontally polarized receiver antenna and the vertically polarized receiver antenna;
receiving the CW signal by the horizontally and vertically polarized receiver antennas to produce first and second calibration signals, respectively;
determining a phase difference between the first and second calibration signals; and
utilizing the determined phase difference to phase calibrate the horizontally polarized receiver antenna and the vertically polarized receiver antenna.

10. The method of claim 1, further comprising:
performing an amplitude calibration process by:
transmitting, by a reference antenna, a first continuous waveform (CW) signal that is polarized with the horizontally polarized receiver antenna;
receiving the first CW signal by the horizontally polarized receiver antenna to produce a first calibration signal;
transmitting, by the reference antenna, a second continuous waveform (CW) signal that is polarized with the vertically polarized receiver antenna;
receiving the second CW signal by the vertically polarized receiver antennas to produce a second calibration signal;
determining an amplitude difference between the first and second calibration signals; and
utilizing the determined amplitude difference to amplitude calibrate the horizontally polarized receiver antenna and the vertically polarized receiver antenna.

11. The method of claim 1, further comprising:
determining an orientation quadrant of the DUT; and
determining whether to flip a sign of one or both of the first and second signals based at least in part on the determined orientation quadrant of the DUT.

12. A non-transitory computer readable memory medium comprising program instructions which, when executed by one or more processors, cause a measurement apparatus comprising a vector signal analyzer to:
receive a first signal that is associated with a first transmitted signal transmitted by a device-under-test (DUT), the first signal received via a horizontally polarized receiver antenna;
receive a second signal that is associated with a second transmitted signal transmitted by the DUT, the second signal received via a vertically polarized receiver antenna, wherein the first signal and the second signal are received without rotation, with respect to the DUT, of at least one of the horizontally polarized receiver antenna or of the vertically polarized receiver antenna; and determine an error vector magnitude (EVM) of a polarized transmission from the DUT, the polarized transmission comprising the first transmitted signal and the second transmitted signal, wherein the EVM is determined based at least in part on the first signal and the second signal.

13. The non-transitory computer readable memory medium of claim 12, wherein determining the EVM of the polarized transmission from the DUT based at least in part on the first signal and the second signal comprises:

coherently combining the first and second signals to reproduce the polarized transmission from the DUT; and determining the EVM of the polarized transmission based at least in part on a difference between the polarized transmission and a reference signal.

14. The non-transitory computer readable memory medium of claim 12, wherein the horizontally polarized receiver antenna and the vertically polarized receiver antenna are coupled to first and second vector signal analyzers (VSAs) of the vector signal analyzer, respectively, and wherein the first and second VSAs share a single local oscillator, and wherein the first and second signals are concurrently received from a single transmission by the DUT.

15. The non-transitory computer readable memory medium of claim 12, wherein the horizontally polarized receiver antenna and the vertically polarized receiver antenna are coupled through a switch to the vector signal analyzer (VSA), wherein toggling the switch switches whether the horizontally polarized receiver antenna or the vertically polarized receiver antenna is connected to the VSA; and wherein the first and second signals are received in a time duplexed manner from sequential transmissions by the DUT.

16. A system, comprising:

an antenna system used for measuring electromagnetic signals produced by a device-under test (DUT), wherein the antenna system comprises a horizontally polarized receiver antenna and a vertically polarized receiver antenna;

a testing apparatus configured to support the DUT and the antenna system; and a computer system comprising a processor and a non-transitory computer-readable memory medium, wherein the memory stores program instructions executable by the processor to cause the system to:

receive a first signal transmitted by the DUT via a horizontally polarized receiver antenna;

receive a second signal transmitted by the DUT via a vertically polarized receiver antenna, wherein the first signal and the second signal are received without rotation, with respect to the DUT, of at least one of the horizontally polarized receiver antenna or of the vertically polarized receiver antenna; and determine an error vector magnitude (EVM) of a polarized transmission from the DUT, the polarized transmission comprising the first transmitted signal and the second transmitted signal, wherein the EVM is determined based at least in part on the first signal and the second signal.

17. The system of claim 16, wherein determining the EVM of the polarized transmission from the DUT based at least in part on the first signal and the second signal comprises:

coherently combining the first and second signals to reproduce the polarized transmission from the DUT; and determining the EVM of the polarized transmission based at least in part on a difference between the polarized transmission and a reference signal.

18. The system of claim 16, wherein the program instructions are further executable to cause the system to:

perform a phase calibration process, wherein, in performing the phase calibration process, the program instructions are executable to cause the system to:

transmit, by a reference antenna, a continuous waveform (CW) signal polarized at an angle between the horizontally polarized receiver antenna and the vertically polarized receiver antenna;

receive the CW signal by the horizontally and vertically polarized receiver antennas to produce first and second calibration signals, respectively;

determine a phase difference between the first and second calibration signals; and utilize the determined phase difference to phase calibrate the horizontally polarized receiver antenna and the vertically polarized receiver antenna.

19. The system of claim 16, wherein the program instructions are further executable to cause the system to:

perform an amplitude calibration process, wherein, in performing the amplitude calibration process, the program instructions are executable to cause the system to:

transmit, by a reference antenna, a first continuous waveform (CW) signal that is polarized with the horizontally polarized receiver antenna;

receive the first CW signal by the horizontally polarized receiver antenna to produce a first calibration signal;

transmit, by the reference antenna, a second continuous waveform (CW) signal that is polarized with the vertically polarized receiver antenna;

receive the second CW signal by the vertically polarized receiver antennas to produce a second calibration signal;

determine an amplitude difference between the first and second calibration signals; and utilize the determined amplitude difference to amplitude calibrate the horizontally polarized receiver antenna and the vertically polarized receiver antenna.

20. The system of claim 16, wherein the program instructions are further executable to cause the system to:

determine an orientation quadrant of the DUT; and determine whether to flip a sign of one or both of the first and second signals based at least in part on the determined orientation quadrant of the DUT.

* * * * *